United States Patent Office 3,256,149
Patented June 14, 1966

3,256,149
COMPOSITIONS COMPRISING AN ALKALOID OF MITRAGYNA SPECIOSA AND METHODS OF USING SAME
Arnold H. Beckett, Bromley, Kent, England, and Edward Macko, Philadelphia, Pa., assignors to Smith Kline & French Laboratories, Philadelphia, Pa., a corporation of Pennsylvania
No Drawing. Filed Aug. 12, 1963, Ser. No. 301,649
Claims priority, application Great Britain, May 20, 1963, 20,044/63
13 Claims. (Cl. 167—55)

This invention relates to a new crystalline product of manufacture, more specifically a crystalline alkaloid produced from leaves of *Mitragyna speciosa*, a plant of the Rubiaceae family. This alkaloid has useful antitussive and analgetic activity.

The crystalline alkaloid is produced from the powdered leaves of *Mitragyna speciosa* by extraction with alcohol. The concentrated, syrupy extract is acidified with glacial acetic acid and diluted with water. The filtered acid solution is made basic with concentrated ammonia and extracted with ether. The residue from the ether extract is dissolved in anhydrous ether and chromatographed on alumina to give the crystalline alkaloid, $C_{23}H_{30}N_2O_4$ melting at 95–96° C. It is soluble in the usual organic solvents such as ethyl alcohol, ether, chloroform, methylene chloride and ethyl acetate and relatively insoluble in water and petroleum ether. Its ultraviolet absorption spectrum in ethanol exhibits the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22). The infrared absorption spectrum obtained in Nujol (a hydrocarbon oil) mull exhibits the following characteristic bands (wavelengths expressed in reciprocal centimeters): 3220, 1690, 1642, 1510, 1560, 1240, 1275, 1150, 775 and 730.

The crystalline alkaloid is an orally effective analgetic agent with potency equal to that of codeine and an oral antitussive agent with potency greater than codeine. These activities of the pure crystalline alkaloid are readily shown by animal experimentation. Thus oral administration to mice, rats and dogs produces analgesia and similar administration to dogs produces an antitussive effect. Of particular significance is that these activities are obtained with minimal side effects. This is in contrast to codeine which causes emesis, restlessness or depression at analgetic dosages. In addition, the crystalline alkaloid has much less effect on the motility of the gastrointestinal tract as measured by charcoal meal propulsion than codeine, demerol or morphine. This alkaloid has less depressant effect on blood pressure and respiration than codeine with no apparent cardiovascular liabilities. Decreased toxicity is also observed in comparison to codeine. A major advantage of the alkaloid is its inability to suppress withdrawal symptoms in morphine-addicted monkeys.

The nontoxic pharmaceutically acceptable acid addition salts of the alkaloid are also included within the scope of this invention since such salts are likewise effective for use as antitussive and analgetic agents. Both inorganic and organic acids can be employed to form pharmaceutically acceptable salts illustrative acids being sulfuric, nitric, phosphoric, citric, acetic, lactic, tartaric, ethanedisulfonic, sulfamic, maleic, hydrochloric, hydrobromic, benzoic and the like. These salts are prepared by methods known to the art. The ethanedisulfonate is a preferred salt of this invention.

For therapeutic use the alkaloid may be formulated into pharmaceutical compositions comprising a carrier and the crystalline alkaloid or a nontoxic acid addition salt thereof in an amount sufficient to produce antitussive and analgetic activity. Preferably the antitussive compositions contain from about 2.5 mg. to about 75 mg. of the alkaloid, advantageously from about 5 mg. to about 50 mg. per dosage unit. Preferably the analgetic compositions contain from about 25 mg. to about 250 mg. of the alkaloid, advantageously from about 50 mg. to about 200 mg. per dosage unit.

The pharmaceutical carrier employed in these composions can be either solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil. Similarly the carrier or diluent may include a time delay material such as glyceryl monostearate or glyceryl distearate alone or with a wax.

A wide variety of pharmaceutical forms can be employed and are prepared by methods well known to the art. Thus if a solid carrier is used the compositions can be tabletted, used as a pharmaceutical powder, placed in a hard gelatin capsule or in the form of a troche or lozenge. If a liquid carrier is used the compositions can be in the form of a soft gelatin capsule.

The crystalline alkaloid or a nontoxic organic or inorganic acid addition salt thereof, preferably with a nontoxic pharmaceutical carirer such as described above, is orally or parenterally administered to animals in pain or coughing, including human beings, in divided doses in dosage units as described above. To produce analegsia the daily dosage is from about 25 mg. to about 500 mg. of the alkaloid, advantageously from about 50 mg. to about 400 mg. To produce an antitussive effect the daily dosage is from about 2.5 mg. to about 300 mg. of the alkaloid, advantageously from about 5 mg. to about 200 mg.

The advantages afforded by the compositions containing per dosage unit the desired therapeutically useful amount of alkaloid and their administration to animals are obvious. These compositions can be prepared containing exact amounts of the alkaloid by virtue of its pure crystalline state. The uniformity and standardization of the desired analgetic and antitussive effects as produced by the crystalline alkaloid is not possible with either the whole plant material of *Mitragyna speciosa* or crude extracts thereof.

The following examples are not limiting but set forth the extraction and illustrate specific pharmaceutical compositions comprising the crystalline alkaloid.

Example 1

The leaves of *Mitragyna speciosa* are powdered and extracted with 95% alcohol by a percolation or maceration process. The alcohol is removed to leave a syrupy extract which is adjusted to pH 3–4 with glacial acetic acid and then diluted with water. The insoluble resinous material is filtered off. The mixed acetic acid liquor is cooled to 0–5° C., adjusted to pH 11 with concentrated ammonia and extracted with ether. The ether is removed and the residue is dissolved in anhydrous ether. This solution is chromatographed on a column of activated alumina to give the crystalline alkaloid which is recrystallized from absolute ethanol, M.P. 95–96° C.; $[\alpha]_D^{25°} = -140.6°$ (concentration=0.3% in chloroform); Rf value 0.53 (silica; 97 chloroform: 3 $CH_3OH$ as developing solvent).

*Analysis.*—Calculated for $C_{23}H_{30}O_4N_2 \cdot C_2H_5OH$: C, 67.46; H, 7.88; N, 6.31; $O-CH_3$, 27.93. Found: C, 67.93; H, 8.19; N, 6.34; $O-CH_3$, 26.73.

The ultraviolet spectrum of the alkaloid exhibits the following characteristic maxima in ethanol: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22).

When suspended in a Nujol mull, absorption bands in the infrared region of the spectrum are present at the following wavelengths expressed in reciprocal centimeters: 3220, 1690, 1642, 1510, 1560, 1240, 1275, 1150, 775 and 730.

The molecular weight of the alkaloid as determined by mass spectrography is 398.

The free base is dissolved in anhydrous ether and poured into a slight excess of a solution of hydrogen chloride in isopropanol. Ether is added to precipitate the crystalline alkaloid hydrochloride salt which is filtered off and dried, M.P. 253–254° C.

*Analysis.*—Calculated for $C_{23}H_{30}O_4N_2 \cdot HCl$: C, 63.52; H, 7.14; N, 6.45; O–CH$_3$, 21.40. Found: C, 63.86; H, 7.11; N, 6.43; O–CH$_3$, 20.76.

The crystalline alkaloid gives an acetate melting at 172° C.; an oxalate melting at 219–220° C. and an ethane-disulfonate salt melting at 272–273° C. (dec.).

*Example 2*

Various strength capsules are prepared containing the pure alkaloid either as the free base or an equivalent amount of a nontoxic pharmaceutically acceptable acid addition salt thereof for use as an antitussive or analgetic from the following ingredients.

(a) Antitussive:

| Medicament, mg. | Magnesium Stearate, mg. | Lactose, mg. |
|---|---|---|
| 5 | 1 | 300 |
| 10 | 1 | 300 |
| 25 | 2 | 300 |

(b) Analgetic:

| Medicament, mg. | Magnesium Stearate, mg. | Lactose, mg. |
|---|---|---|
| 50 | 3 | 250 |
| 100 | 3 | 200 |
| 200 | 4 | 100 |

The above ingredients are screened through a #40 U.S. mesh screen, mixed and filled into #2 hard gelatin capsules.

What is claimed is:

1. A pharmaceutical composition having antitussive and analgetic activity, in dosage unit form, comprising a pharmaceutical carrier and from about 2.5 mg. to about 250 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:

a melting point of 95–96° C.;

an optical rotation of, $[\alpha]_D^{25°} = -140.6°$ (concentration: 0.3% in chloroform);

an ultraviolet absorption spectrum in ethanol with the following characteristic maxima: max. λ 226 mµ (log ε 4.61), max. λ 291 mµ (log ε 4.23); minimum at max. λ 288 mµ (log ε 4.16) and shoulders at max. λ 250 mµ (log ε 4.39), max. λ 270 mµ (log ε 4.28) and max. λ 282.5 mµ (log ε 4.22); and an infrared absorption spectrum in a hydrocarbon oil with bands at the following wavelengths, expressed in reciprocal centimeters: 3220, 1690, 1642, 1510, 1560, 1240, 1275, 1150, 775 and 730.

2. A pharmaceutical composition having antitussive activity, in dosage unit form, comprising a pharmaceutical carrier and from about 2.5 mg. to about 75 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:

a melting point of 95–96° C.;

an optical rotation of, $[\alpha]_D^{25°} = -140.6°$ (concentration: 0.3% in chloroform);

an ultraviolet absorption spectrum in ethanol with the following characteristic maxima: max. λ 226 mµ (log ε 4.61), max. λ 291 mµ (log ε 4.23); minimum at max. λ 288 mµ (log ε 4.16) and shoulders at max. λ 250 mµ (log ε 4.39), max. λ 270 mµ (log ε 4.28) and max. λ 282.5 mµ (log ε 4.22); and an infrared absorption spectrum in a hydrocarbon oil with bands at the following wavelengths, expressed in reciprocal centimeters: 3220, 1690, 1642, 1510, 1560, 1240, 1275, 1150, 775 and 730.

3. A pharmaceutical composition having antitussive activity, in dosage unit form, comprising a pharmaceutical carrier and from about 5 mg. to about 50 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:

a melting point of 95–96° C.;

an optical rotation of, $[\alpha]_D^{25°} = -140.6°$ (concentration: 0.3% in chloroform);

an ultraviolet absorption spectrum in ethanol with the following characteristic maxima: max. λ 226 mµ (log ε 4.61), max. λ 291 mµ (log ε 4.23); minimum at max. λ 288 mµ (log ε 4.16) and shoulders at max. λ 250 mµ (log ε 4.39), max. λ 270 mµ (log ε 4.28) and max. λ 282.5 mµ (log ε 4.22); and an infrared absorption spectrum in a hydrocarbon oil with bands at the following wavelengths, expressed in reciprocal centimeters: 3220, 1690, 1642, 1510, 1560, 1240, 1275, 1150, 775 and 730.

4. A pharmaceutical composition having analgetic activity, in dosage unit form, comprising a pharmaceutical carrier and from about 25 mg. to about 250 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:

a melting point of 95–96° C.;

an optical rotation of, $[a]_D^{25°} = -140.6°$ (concentration: 0.3% in chloroform);

an ultraviolet absorption spectrum in ethanol with the following characteristic maxima: max. λ 226 mµ (log ε 4.61), max. λ 291 mµ (log ε 4.23); minimum at max. λ 288 mµ (log ε 4.16) and shoulders at max. λ 250 mµ (log ε 4.39), max. λ 270 mµ (log ε 4.28) and max. λ 282.5 mµ (log ε 4.22); and an infrared absorption spectrum in a hydrocarbon oil with bands at the following wavelengths, expressed in reciprocal centimeters: 3220, 1690, 1642, 1510, 1560, 1240, 1275, 1150, 775 and 730.

5. A pharmaceutical composition having analgetic activity, in dosage unit form, comprising a pharmaceutical carrier and from about 50 mg. to about 200 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:

a melting point of 95–96° C.;

an optical rotation of, $[a]_D^{25°} = -140.6°$ (concentration: 0.3% in chloroform);

an ultraviolet absorption spectrum in ethanol with the following characteristic maxima: max. λ 226 mµ (log ε 4.61), max. λ 291 mµ (log ε 4.23); minimum at max. λ 288 mµ (log ε 4.16) and shoulders at max. λ 250 mµ (log ε 4.39), max. λ 270 mµ (log ε 4.28) and max. λ 282.5 mµ (log ε 4.22); and an infrared absorption spectrum in a hydrocarbon oil with bands at the following wavelengths, expressed in reciprocal centimeters: 3220, 1690, 1642, 1510, 1560, 1240, 1275, 1150, 775 and 730.

6. A method of producing an antitussive effect which comprises internally administering to an animal from about 2.5 mg. to about 75 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:
- a melting point of 95–96° C.;
- an optical rotation of, $[\alpha]_D^{25°} = -140.6°$ (concentration: 0.3% in chloroform);
- an ultraviolet absorption spectrum in ethanol with the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22); and
- an infrared absorption spectrum in a hydrocarbon oil with bands at the following wavelengths, expressed in reciprocal centimeters: 3220, 1690, 1642, 1510, 1560, 1240, 1275, 1150, 775 and 730.

7. The method in accordance with claim 6 in which the administration is orally to human beings.

8. A method of producing analgesia which comprises internally administering to an animal from about 25 mg. to about 250 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:
- a melting point of 95–96° C.;
- an optical rotation of, $[\alpha]_D^{25°} = -140.6°$ (concentration: 0.3% in chloroform);
- an ultraviolet absorption spectrum in ethanol with the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22); and
- an infrared absorption spectrum in a hydrocarbon oil with bands at the following wavelengths, expressed in reciprocal centimeters: 3220, 1690, 1642, 1510, 1560, 1240, 1275, 1150, 775 and 730.

9. The method in accordance with claim 8 in which the administration is orally to human beings.

10. A method of producing an antitussive effect which comprises internally administering to an animal a daily dosage of from about 2.5 mg. to about 300 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:
- a melting point of 95–96° C.;
- an optical rotation of, $[\alpha]_D^{25°} = -140.6°$ (concentration: 0.3% in chloroform);
- an ultraviolet absorption spectrum in ethanol with the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22); and
- an infrared absorption spectrum in a hydrocarbon oil with bands at the following wavelengths, expressed in reciprocal centimeters: 3220, 1690, 1642, 1510, 1560, 1240, 1275, 1150, 775 and 730.

11. A method of producing an antitussive effect which comprises internally administering to an animal a daily dosage of from about 5 mg. to about 200 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:
- a melting point of 95–96° C.;
- an optical rotation of, $[\alpha]_D^{25°} = -140.6°$ (concentration: 0.3% in chloroform);
- an ultraviolet absorption spectrum in ethanol with the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22); and
- an infrared absorption spectrum in a hydrocarbon oil with bands at the following wavelengths, expressed in reciprocal centimeters: 3220, 1690, 1642, 1510, 1560, 1240, 1275, 1150, 775 and 730.

12. A method of producing analgesia which comprises internally administering to an animal a daily dosage of from about 25 mg. to about 500 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:
- a melting point of 95–96° C.;
- an optical rotation of, $[\alpha]_D^{25°} = -140.6°$ (concentration: 0.3% in chloroform);
- an ultraviolet absorption spectrum in ethanol with the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16 and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22); and
- an infrared absorption spectrum in a hydrocarbon oil with bands at the following wavelengths, expressed in reciprocal centimeters: 3220, 1690, 1642, 1510, 1560, 1240, 1275, 1150, 775 and 730.

13. A method of producing analgesia which comprises internally administering to an animal a daily dosage of from about 50 mg. to about 400 mg. of a member selected from the group consisting of a crystalline alkaloid produced from leaves of *Mitragyna speciosa* and a nontoxic pharmaceutically acceptable acid addition salt thereof, said crystalline alkaloid, analyzing for the empirical formula: $C_{23}H_{30}N_2O_4$, having:
- a melting point of 95–96° C.;
- an optical rotation of, $[\alpha]_D^{25°} = -140.6°$ (concentration: 0.3% in chloroform);
- an ultraviolet absorption spectrum in ethanol with the following characteristic maxima: max. $\lambda$ 226 m$\mu$ (log $\epsilon$ 4.61), max. $\lambda$ 291 m$\mu$ (log $\epsilon$ 4.23); minimum at max. $\lambda$ 288 m$\mu$ (log $\epsilon$ 4.16) and shoulders at max. $\lambda$ 250 m$\mu$ (log $\epsilon$ 4.39), max. $\lambda$ 270 m$\mu$ (log $\epsilon$ 4.28) and max. $\lambda$ 282.5 m$\mu$ (log $\epsilon$ 4.22); and
- an infrared absorption spectrum in a hydrocarbon oil with bands at the following wavelengths, expressed in reciprocal centimeters: 3220, 1690, 1642, 1510, 1560, 1240, 1275, 1150, 775 and 730.

No references cited.

JULIAN S. LEVITT, *Primary Examiner.*